United States Patent
Fennel et al.

(10) Patent No.: US 6,220,095 B1
(45) Date of Patent: Apr. 24, 2001

(54) SENSOR FOR MEASURING YAW, PITCH OR ROLL MOVEMENTS

(75) Inventors: Helmut Fennel, Bad Soden; Michael Latarnik, Friedrichsdorf, both of (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/242,838

(22) PCT Filed: Jun. 25, 1997

(86) PCT No.: PCT/EP97/03334

§ 371 Date: Dec. 8, 1999

§ 102(e) Date: Dec. 8, 1999

(87) PCT Pub. No.: WO98/08054

PCT Pub. Date: Feb. 26, 1998

(30) Foreign Application Priority Data

Aug. 19, 1996 (DE) ............................................. 196 33 269

(51) Int. Cl.$^7$ .................................................. G01P 15/08
(52) U.S. Cl. ...................................... 73/514.08; 73/514.09
(58) Field of Search ........................... 73/514.08, 514.09, 73/514.03, 514.05, 514.06, 504.05, 504.06, 504.07

(56) References Cited

U.S. PATENT DOCUMENTS

| 3,260,121 | * | 7/1966 | Johnston | 73/514.09 |
| 3,516,294 | * | 6/1970 | Schmieder | 73/514.08 |
| 3,618,399 | | 11/1971 | Aske | 73/504.07 |
| 3,691,850 | * | 9/1972 | Slater et al. | 73/514.08 |
| 3,984,918 | * | 10/1976 | Chaney | 73/514.09 |
| 4,192,189 | * | 3/1980 | Presley | 73/514.08 |
| 4,991,438 | * | 2/1991 | Evans | 73/514.08 |
| 5,665,912 | * | 9/1997 | Laughlin | 73/504.05 |

FOREIGN PATENT DOCUMENTS

| 21 57 523 | 5/1972 | (DE) . |
| 23 47 149 | 3/1974 | (DE) . |
| 35 10 987 | 10/1985 | (DE) . |
| 39 32 457 | 3/1990 | (DE) . |
| 02 01 249 | 11/1986 | (EP) . |
| 0 566 130 | 10/1993 | (EP) . |
| 22 37 638 | 5/1991 | (GB) . |
| 91 01 008 | 1/1991 | (WO) . |

OTHER PUBLICATIONS

Yarkykh et al: "Electrokinetic Transducer for Motion Angular Parameters" Measurement Techniques, vol. 35, No. 9, Sep. 1992, New York.

Patents Abstracts of Japan, vol. 16, No. 245 (M–1260), Jun. 4, 1992.

Article from Electro–Technology, 66 (1960.12), 6,11 entitled "The Magnetohydrodynamic Gyroscope".

* cited by examiner

Primary Examiner—Helen Kwok
(74) Attorney, Agent, or Firm—Rader, Fishman & Grauer PLLC

(57) ABSTRACT

A sensor for measurement of yawing motion, pitching or rolling motion, particularly as suited for use in motor vehicle control systems, contains an annular hollow object (1, 2, 4) in which a magnetic fluid (MF) is located. The magnetic fluid is set into rotation by an electromagnetic field and serves as the rotating mass of the sensor. The measuring signal is obtained by measuring the forces (F) acting on the rotating mass or by generating compensation fields.

8 Claims, 1 Drawing Sheet

SENSOR FOR MEASURING YAW, PITCH OR ROLL MOVEMENTS

BACKGROUND OF THE INVENTION

The invention relates to a sensor for angular motion, in particular for the use as a yaw rate sensor.

There are motor vehicle control systems that require information on the yawing motion of the vehicle, specifically through the vehicle's movements around the vertical axis. These include, for example, vehicle stability control systems (FSR, ASMS). Other motor vehicle control systems, such as anti-lock braking systems (ABS), drive slip control systems (ASR), etc. can be improved by accounting for yawing motion. Information on pitching and rolling motions is also advantageous for certain motor vehicle control systems.

However, measuring yawing motion presents difficulties. Yawing motion sensors are expensive, especially when they are expected to provide a high degree of reliability, resolution and measuring precision. However, the price of the individual components plays a decisive role, particularly in motor vehicle control systems.

Proposals have already been made involving the use of the balance weights and rotating masses already present in the vehicle to measure yaw rates or yaw torques as input variables for motor vehicle control systems. According to these proposals, measuring and analysis equipment can be used to transform the balance weights and rotating masses into yaw rate and yaw torque sensors. example, the centrifugal mass of the vehicle engine or of a rotating mass located in a tape recorder, CD player or other electronic device may be used to achieve the desired outcome.

If no cost-effective yaw rate sensors are available, shear forces in anti-lock control systems are determined indirectly using complex calculations that are based on wheel RPM data (RPM=rotations per minute). Based on the current level of technology, however, yaw rate sensors are indispensable in other control systems, such as vehicle stability control systems.

The objective of the invention is to develop a sensor for measuring yawing, pitching or rolling motion, i.e. angular motion, particularly for measuring yaw rates or yaw torques, that is relatively inexpensive, operates reliably and delivers signals that can be processed relatively easily.

SUMMARY OF THE INVENTION

It has become evident that this objective can be achieved with a sensor with a rotating mass which is a magnetic fluid located in an annular or ring-like hollow object, and that it is set into motion by an electromagnetic field.

Consequently, the invention is based on the knowledge that a yaw rate sensor that can also be used to measure other angular motion pitching and rolling motion, can be constructed on the basis of a rotating magnetic fluid. This type of sensor is already used, for example, to obtain input control variables for a vehicle stability control system. The use of the sensor output signals to improve and/or monitor the control variables and control processes in an anti-lock braking system (ABS) or drive slip control system (ASR), etc. is also conceivable. In practice, this type of application is only worthwhile if it is possible to manufacture the sensor at little cost.

When yawing, pitching or rolling motion occurs, the magnetic fluid rotating in the hollow object is displaced relative to the vehicle on which the sensor is located. The forces or changes in forces associated with this motion can be measured and converted into analyzable electronic signals.

According to an advantageous embodiment of the invention, the electromagnetic field that sets the magnetic fluid into rotation is generated by means of coils located outside the casing. It is advantageous to use several coils that are distributed along both sides and around the circumference of the casing. Information on yawing motion, etc., can be obtained by measuring and changing individual field components.

According to another embodiment of the invention, the hollow object or hollow space in which the magnetic fluid is located is secured to the body or to the vehicle near the rotational axis of the rotating mass. The forces or moments acting on the rotational axis of the mass are measured and analyzed to determine yawing motions or yaw torques. On the other hand, it is also possible to attach the hollow object used as a casing for the magnetic fluid to the vehicle by means of diametrically engaging fastening elements, and to measure the forces acting on these fastening elements to determine yawing motion, etc.

Furthermore, in many cases it is particularly advantageous if the electromagnetic rotary field is generated by a multitude of coils and if the forces produced as a result of yawing motion are compensated for by changing the components of the electromagnetic rotary field; these field changes can be measured to determine the yawing motion of the vehicle and the yaw torque. An electric signal representing the motion being measured can be obtained in this manner.

The sensor according to the invention is particularly suitable for measuring the yawing motion of a motor vehicle. To this end, it is arranged near the vehicle's center of gravity and is oriented in such a way that the rotational plane of the magnetic fluid runs in the vehicle's direction of motion and perpendicular to the driving plane, or in a position approximating this one.

Additional features, advantages and possible applications of the invention are evident in the following discussion of further details, which is based on the enclosed figures.

DETAILED DESCRIPTION OF THE DRAWINGS

Figure 1:
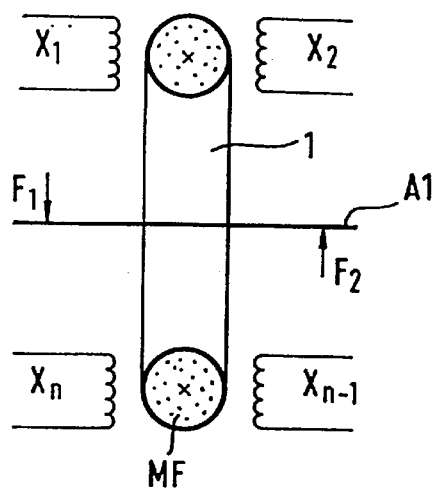
FIG. 1 schematically shows the arrangement of significant components of the sensor according to the invention.

FIG. 1 illustrates the principle design of a sensor according to the invention. A diagonal section is depicted. A magnetic fluid MF is located in an annular hollow object 1 with a circular or rectangular cross-section that serves as a housing and is set into rotation by an electromagnetic field. Coils are provided to generate this field or the individual field components. According to FIG. 1, a multitude of coils $x_1$ to $x_n$ are present; these coils are distributed along the circumference of the annular hollow object 1 on both sides of this hollow object. Although there are many possible options for the design of the coils, their division into individual coils and their positioning, the only important issue is that a rotary field is produced which sets the magnetic fluid MF located inside the hollow space into rotation.

In the case of a vehicle sensor, the annular hollow object 1 is connected with the vehicle body, which undergoes the motion being measured. Advantageously, the sensor is placed near the vehicle's center of gravity and is oriented in such a way that the rotational plane of the magnetic fluid runs in the vehicle's direction of motion and perpendicular to the driving plane. This is also the ideal position. It is evident that if the sensor and, particularly, the hollow object 1, is positioned or oriented in any other way, the measuring processes will only cover one corresponding component. Although measurement of the yawing motion of the vehicle or of the yaw torque is of primary concern in the application scenario being discussed here, the sensor according to the invention can also be used to measure pitching or rolling motion, as these motions also change the forces acting on the rotating magnetic fluid.

The forces or force components $F_1$, $F_2$ acting on the rotating mass across the (theoretical) rotational axis A1 are indicated in FIG. 1. The change in and, if applicable, the direction of these forces represents a measure for the yawing, pitching or rolling motion completed by the vehicle.

Figure 2A:
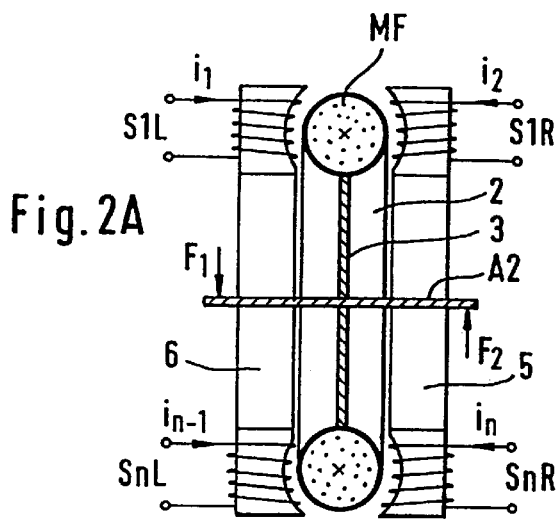
FIG. 2A shows a vertical section, schematically simplified, of a embodiment of a sensor according to the invention.
Figure 2B:
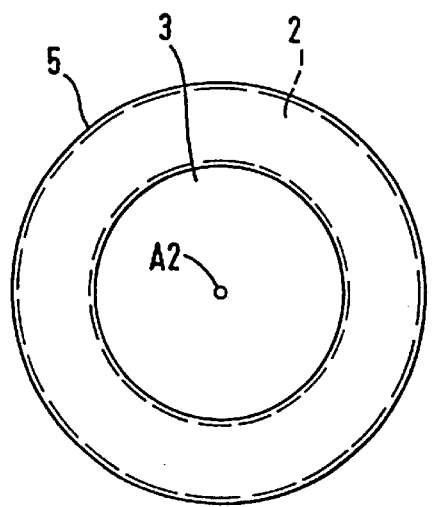
FIG. 2B shows a side view of the sensor according to FIG. 2A.

FIG. 2A and FIG. 2B depict the structure of a sensor operating in accordance with the principle described above. Again, the magnetic fluid MF is located inside an annular hollow space 2 which, in this case, is carried by a disk 3 running on thrust bearings. The sensor carries a multitude of coils S1L, SnL, S1R, SnR. Only four coils S1L, SnL, S1R, SnR are depicted. As described earlier, these coils produce a rotary field that sets the magnetic fluid MF into rotation. The forces $F_1$, $F_2$ acting on the axis A2 or in the vicinity of this axis are, once again, measured and analyzed.

The coils S1L, SnL, S1R, SnR and coil carriers 5, 6 form the "stator" of the sensor depicted here. In the embodiment described here, the forces $F_1$, $F_2$ acting on the rotating mass are measured using wire strain gauges, etc.

According to a second variant, the electromagnetic field generated by the coils S1L, SnL, S1R, SnR is varied in relation to the measuring signal. The forces produced by the yawing motion being measured are compensated for by modifying the electromagnetic field, i.e., the individual components, and the forces produced by this field, so as to keep the rotating magnetic fluid MF within the prescribed rotational plane. Depending on how the invention is executed, these compensation forces are created either by changing the currents that generate the electromagnetic rotary field or by means of supplementary coils. Diametrically opposed coils arranged on opposite sides of the annular hollow object are suitable for compensating for the forces produced by yawing motion; these coils produce the necessary compensation forces. These compensation forces or compensation currents are regulated in relation to the forces measured in, for example, the vicinity of the rotational axis.

Figure 3:
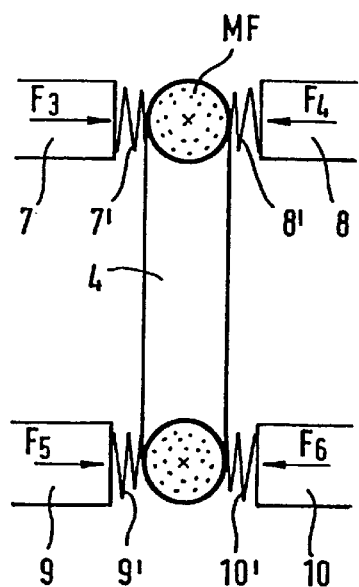
FIG. 3 schematically shows a sensor with mounting and measuring elements secured to the housing ring.

FIG. 3 illustrates that an annular hollow space 4 that contains the magnetic fluid MF can, as a rule, also be held in place by fastening elements 7–10 that engage the periphery and/or the annular hollow space 4. Instead of measuring force in the vicinity of the rotational axes A1, A1 (see FIGS. 1, 2), the forces absorbed by the retention or fastening elements 7–10, 7'–10' are measured and analyzed in this embodiment. In this case, the annular hollow space 4 is positioned and held in place by suspension elements 7'–10'. The forces and changes in forces which occur, and which can be analyzed to obtain the measured variable, are measured, recorded and converted into electric signals by means of wire strain gauges, piezoelectric force measuring devices and other known elements of this nature.

As far as the compensation method that can be used in connection with the embodiments in both FIGS. 2 and 3 is concerned, it has proven advantageous to use separate coils to generate the rotary field, on the one hand, and the compensation forces, on the other hand. In principle, however, it is also possible to superimpose the currents generating the rotary field and the compensation currents and to allow these currents to act across the same coils.

What is claimed is:

1. Sensor for measurement of an angular motion, comprising:

a rotating mass that is connected to a body, the rotating mass being a magnetic fluid that is located in a ring-like hollow space and that is rotated around a rotational axis by an electromagnetic field; and equipment for measuring and analyzing forces acting on the rotating mass.

2. The sensor according to claim 1, wherein the electromagnetic field that rotates the magnetic fluid is generated by means of coils arranged outside the hollow space.

3. The sensor according to claim 2, wherein, in order to generate an electromagnetic field to rotate the magnetic fluid, a plurality of coils is distributed along the circumference on two sides of the hollow space in which the magnetic fluid is located.

4. The sensor according to claims 1, wherein forces acting on the rotational axis of the magnetic fluid are measured and analyzed to determine a yawing motion of the body which the sensor is connected to.

5. The sensor according to claim 1, wherein the measurement is carried out by means of diametrically engaging fastening elements, and wherein forces acting on the fastening elements are measured and are analyzed to determine the angular motion of the body to which the sensor is connected.

6. The sensor according to claim 5, wherein the electromagnetic field is generated by a multitude of coils, such that the forces produced as a result of the angular motion of the body are compensated for by modifying currents that generate components of the electromagnetic field, and that the changes in current and/or field are analyzed to determine the angular motion.

7. A method of installing a sensor with a magnetic fluid that is rotated around a ring-like hollow space about a rotational axis by an electromagnetic field for measuring an angular motion in a vehicle, including the steps of:

arranging the sensor in proximity to the center of gravity of the vehicle;

orienting the sensor in such a way that a rotational plane of the magnetic fluid approximately runs perpendicular to the plane of the angular motion to be measured; and connecting the sensor to the vehicle.

8. The sensor according to claim 6, wherein changes in the position of the rotational axis of the rotating mass due to yawing motion or due to forces occurring at the rotational axis, or moments, can be analyzed to determine yawing motion of the vehicle or yawing moments.

* * * * *